United States Patent
Rankin

(10) Patent No.: US 11,032,257 B1
(45) Date of Patent: Jun. 8, 2021

(54) METHOD FOR COVERTLY DELIVERING A PACKET OF DATA OVER A NETWORK

(71) Applicant: John Rankin, Morgantown, WV (US)

(72) Inventor: John Rankin, Morgantown, WV (US)

(73) Assignee: Rankin Labs, LLC, Williamsport, OH (US)

( * ) Notice: Subject to any disclaimer, the term of this patent is extended or adjusted under 35 U.S.C. 154(b) by 128 days.

(21) Appl. No.: 16/210,202

(22) Filed: Dec. 5, 2018

Related U.S. Application Data

(60) Provisional application No. 62/596,402, filed on Dec. 8, 2017.

(51) Int. Cl.
    *H04L 29/06* (2006.01)
    *H04L 12/741* (2013.01)
    *H04L 29/08* (2006.01)

(52) U.S. Cl.
    CPC .......... *H04L 63/0485* (2013.01); *H04L 45/74* (2013.01); *H04L 69/16* (2013.01); *H04L 69/22* (2013.01)

(58) Field of Classification Search
    CPC .............. H04L 63/0485; H04L 47/193; H04L 41/0677; H04L 69/16; H04L 45/74; H04L 69/22
    USPC ........ 713/150, 151, 153, 160; 370/389, 468, 370/470
    See application file for complete search history.

(56) References Cited

U.S. PATENT DOCUMENTS

| | | |
|---|---|---|
| 3,688,090 A | 8/1972 | Rankin |
| 6,023,724 A | 2/2000 | Bhatia et al. |
| 6,567,416 B1 | 5/2003 | Chuah |
| 6,714,985 B1 | 3/2004 | Malagrino et al. |
| 6,757,248 B1 | 6/2004 | Li et al. |
| 7,103,025 B1 | 9/2006 | Choksi |
| 7,215,684 B1 | 5/2007 | Rosen et al. |
| 8,090,866 B1 | 1/2012 | Bashyam et al. |
| 8,374,091 B2 | 2/2013 | Chiang |
| 8,397,151 B2 | 3/2013 | Salgado et al. |
| 8,730,966 B2 | 5/2014 | Awano |
| 9,350,663 B2 | 5/2016 | Rankin |
| 9,386,028 B2 * | 7/2016 | Altman ................. G06F 21/554 |
| 2001/0017844 A1 | 8/2001 | Mangin |

(Continued)

FOREIGN PATENT DOCUMENTS

CN      103841118 A      6/2014

OTHER PUBLICATIONS

"Covert Data Storage Channel Using IP Packet Headers"—Jonathan Thyer, SANS Institute Information Security Reading Room, Jan. 30, 2008 https://www.sans.org/reading-room/whitepapers/covert/covert-data-storage-channel-ip-packet-headers-2093 (Year: 2008).*

(Continued)

*Primary Examiner* — Randy A Scott
(74) *Attorney, Agent, or Firm* — Standley Law Group LLP

(57) ABSTRACT

A method for covertly transmitting a packet of data over a network is provided. A datagram for transmission is fragmented. A portion of the data in the datagram is encrypted and stored within a fragment section of the datagram which is not a first fragmented section. Only the fragmented section that contains the encrypted data is transmitted. No other fragment of the fragmented datagram is transmitted such that the lone fragment transmission will appear as error.

16 Claims, 6 Drawing Sheets

(56) References Cited

U.S. PATENT DOCUMENTS

| | | |
|---|---|---|
| 2001/0019614 A1 | 9/2001 | Madoukh |
| 2002/0041592 A1 | 4/2002 | Van Der Zee et al. |
| 2002/0054570 A1 | 5/2002 | Takeda |
| 2002/0071436 A1 | 6/2002 | Border et al. |
| 2002/0164024 A1* | 11/2002 | Arakawa ............... H04L 69/16 380/210 |
| 2003/0031198 A1 | 2/2003 | Currivan et al. |
| 2003/0056009 A1* | 3/2003 | Mizrachi ............... H04L 69/16 709/245 |
| 2003/0115364 A1* | 6/2003 | Shu ............... H04L 63/0428 709/246 |
| 2005/0060538 A1* | 3/2005 | Beverly ............... H04L 9/00 713/160 |
| 2005/0105506 A1 | 5/2005 | Birdwell et al. |
| 2005/0286517 A1 | 12/2005 | Babbar et al. |
| 2006/0002681 A1 | 1/2006 | Spilo et al. |
| 2006/0034317 A1 | 2/2006 | Hong et al. |
| 2006/0133364 A1 | 6/2006 | Venkatsubra |
| 2006/0259587 A1 | 11/2006 | Ackerman et al. |
| 2007/0025388 A1 | 2/2007 | Abhishek et al. |
| 2007/0028121 A1 | 2/2007 | Hsieh |
| 2007/0223395 A1 | 9/2007 | Lee et al. |
| 2008/0104313 A1 | 5/2008 | Chu |
| 2009/0046717 A1 | 2/2009 | Li |
| 2009/0110003 A1 | 4/2009 | Julien et al. |
| 2010/0103830 A1 | 4/2010 | Salgado et al. |
| 2011/0149891 A1 | 6/2011 | Ramakrishna |
| 2011/0231564 A1 | 9/2011 | Korsunsky et al. |
| 2012/0117376 A1 | 5/2012 | Fink et al. |
| 2012/0243539 A1 | 9/2012 | Keesara |
| 2012/0289250 A1 | 11/2012 | Fix et al. |
| 2012/0300648 A1 | 11/2012 | Yang |
| 2012/0307678 A1 | 12/2012 | Gerber et al. |
| 2013/0028121 A1 | 1/2013 | Rajapakse |
| 2013/0058231 A1 | 3/2013 | Paddon et al. |
| 2013/0091102 A1 | 4/2013 | Nayak |
| 2013/0343377 A1 | 12/2013 | Stroud et al. |
| 2014/0100014 A1 | 4/2014 | Bennett, III et al. |
| 2014/0254598 A1 | 9/2014 | Jha et al. |
| 2014/0294019 A1 | 10/2014 | Quan et al. |
| 2015/0100613 A1 | 4/2015 | Osiecki et al. |
| 2015/0229714 A1 | 8/2015 | Venkatsubra et al. |
| 2015/0264083 A1* | 9/2015 | Prenger ............... H04L 63/1408 726/23 |
| 2016/0269294 A1 | 9/2016 | Rankin |
| 2017/0090872 A1 | 3/2017 | Mathew et al. |
| 2018/0018147 A1 | 1/2018 | Sugawara |
| 2018/0102975 A1 | 4/2018 | Rankin |

OTHER PUBLICATIONS

Thyer, J., Covert Data Storae Channel Using IP Packet Headers, SANS Institute, Information Security Reading Room, Jan. 30, 2008.

Information Sciences Institute, University of Southern California, RFC 791, Internet Protocol, DARPA Internet Program Protocol Specification, Sep. 1981.

Postel, J., RFC 792, Internet Control Message Protocol, DARPA Internet Program Protocol Specification, Sep. 1981.

Information Sciences Institute, University of Southern California, RFC 793, Transmission Control Protocol, DARPA Internet Program Protocol Specification, Sep. 1981.

McCann, J. et al., RFC 1981, Path MTU Discovery for IP version 6, Aug. 1996.

Mathis, M. et al., TCP Selective Acknowledgment Options, Oct. 1996.

Montenegro, G. et al., RFC 4944, Transmission of IPv6 Packets over IEEE 802.15.4 Networks, Sep. 2007.

Paxson et al., RFC 2330, Framework for IP Performance Metrics, May 1998.

Thubert, P. et al., LLN Fragment Forwarding and Recovery draft-thubert-6lo-forwarding-fragments-02, Nov. 25, 2014.

Li, T. et al., A New MAC Scheme for Very High-Speed WLANs, Proceedings of the 2006 International Symposium on a World of Wireless, Mobile and Multimedia Networks, 2006.

Rabah, K., Steganography—The Art of Hiding Data, Information Technology Journal, 2004, pp. 245-269.

Arkin, O., ICMP Usage in Scanning, The Complete Know-How, Jun. 2001.

\* cited by examiner

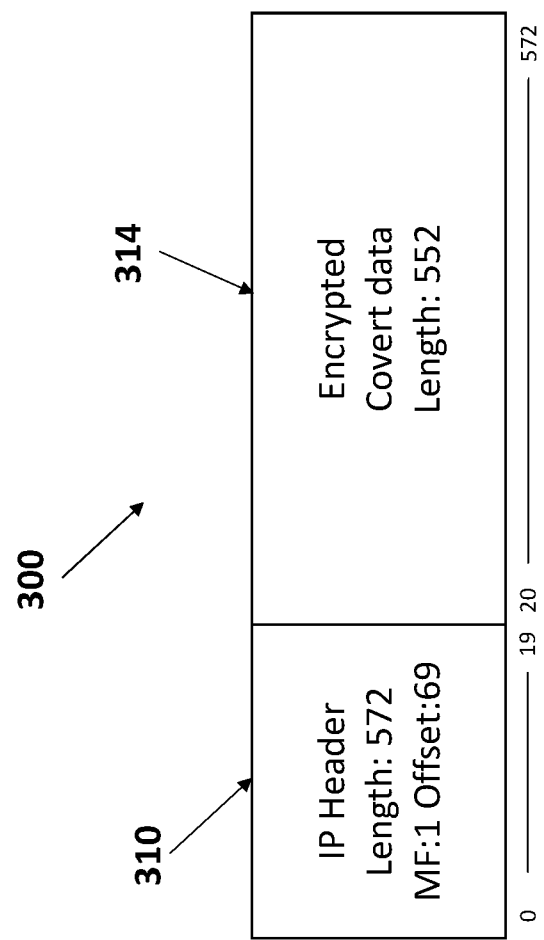

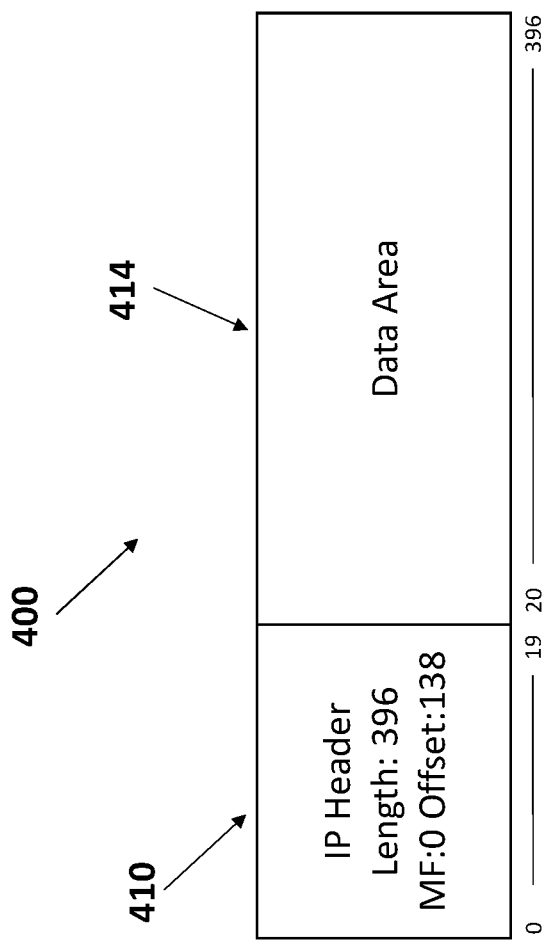

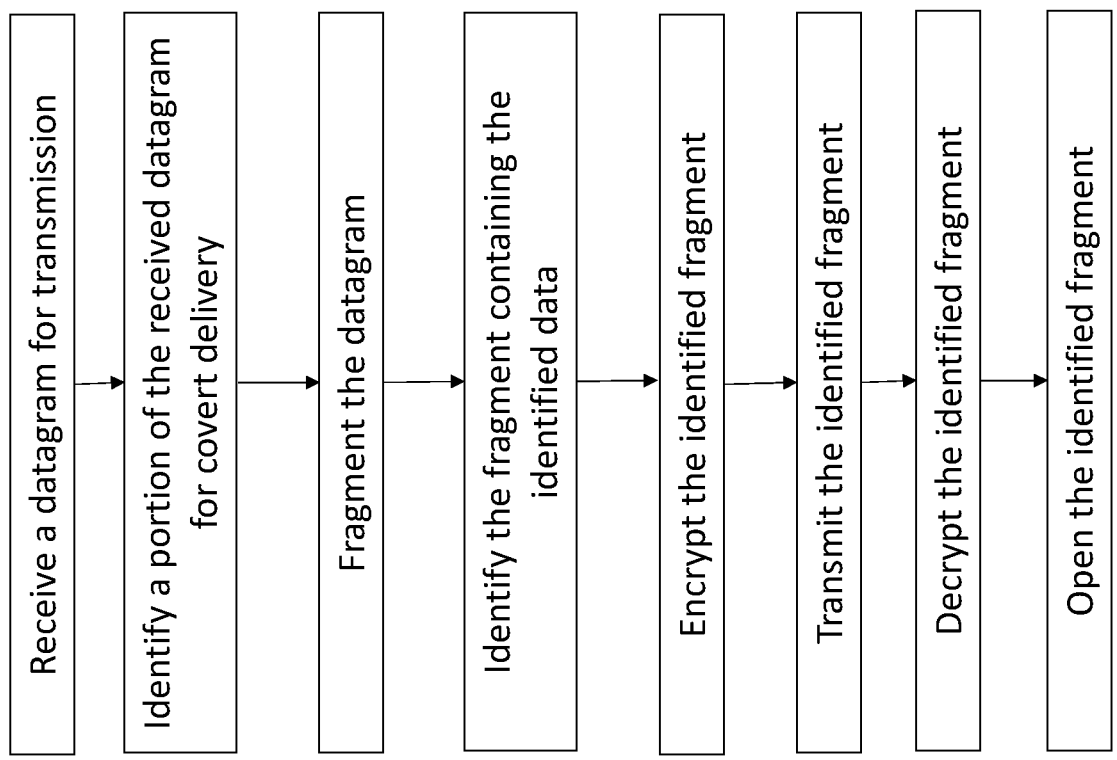

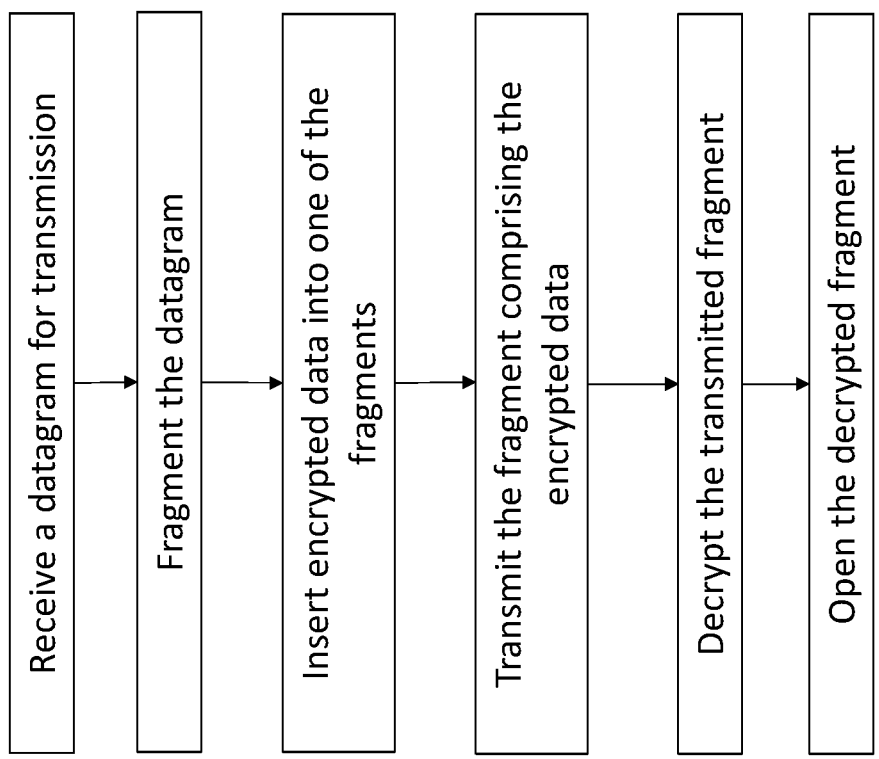

METHOD FOR COVERTLY DELIVERING A PACKET OF DATA OVER A NETWORK

CROSS-REFERENCE TO RELATED APPLICATIONS

This application claims the benefit of U.S. Provisional Application Ser. No. 62/596,402 filed Dec. 8, 2017, the disclosures of which are hereby incorporated by reference in their entireties as if fully restated herein.

TECHNICAL FIELD

Exemplary embodiments of the present invention relate to covertly sending packets of data over a network.

BACKGROUND AND BRIEF SUMMARY OF THE INVENTION

TCP/IP is the basic communication protocol that makes up the Internet. All computers that send communication over the Internet must implement a complex stack of routines that breakdown and distribute the network communication to the individual programs that are communicating between machines.

The TCP/IP protocol was developed for the United States Advanced Research Projects Agency (ARPA). The TCP/IP protocol is a set of rules that enable different types of network-enabled or networked devices to communicate with each other. Those network devices communicate by using the TCP/IP standard, or format, to transfer or share data. TCP/IP rules are established and maintained by the Internet Engineering Task Force (IETF). The IETF is an international community of network designers, operators, vendors, and researchers concerned with the Internet's architecture and operation. The IETF's mission is to produce technical and engineering documents that influence the way people design, use and manage the Internet with the goal of improving its operations and efficiencies. These documents include protocol standards, best current practices and information updates of various kinds, and are commonly referred to as Request for Comments (RFC).

The IP layer actually performs the communication function between two networked hosts. The IP software receives data segments from the TCP layer, ensures that the segment is sized properly to meet the requirements of the transmission path and physical adapters (such as Ethernets and CTCs). IP changes the segment size if necessary by breaking it down into smaller IP datagrams, and transmits the data to the physical network interface or layer of the host. [RFC 791, 1981]

The IP layer uses a well defined and easily observed method for transporting data between two networked hosts; however, there are occasionally specialized applications that require the ability to transport this data in a discrete and covert way. This inventive process describes a method where communication may take place, using the well understood RFCs, but masks the existence of the communication to avoid observation, detection, and in many cases bypassing firewalls and sniffers. There may be any number of reasons to covertly transport such data including for privacy and confidentiality reasons.

The objectives of the covert transmission are to allow an external system to transmit a discrete unit of data into the TCP/IP stack, or IP layer, in a way that the IP layer can read and utilize, without observation. There are several important objectives: first is to avoid network behavior that can be reported by network sniffers; second, it is important to create communication traffic that will not be filtered out by firewalls, if possible; last, if the traffic is observed, it will appear as static or an unreadable communication error.

While firewalls can retard traffic, they generally have little or no effect upon some layers of communication. It is quite possible that a TCP/IP stack might have some ports that are open to a wide variety of traffic, while others are restricted; therefore, the covert communication will be confined to other layers of the protocol stack, so as to avoid these user-imposed restrictions.

Network sniffers collect and organize traffic based upon recognizable elements; therefore, the covert data will fall outside predefined standards, and have the appearance of network static or partial fragments.

In order for covert data to appear as static, it will need to be encrypted in a form that appears as disturbed transmission data. When information is out of place and modified into a form that is unreadable, it will not be observable as organized information.

An exemplary method for delivering covert data includes containing the covert data within a second fragment of a fragmented IP datagram. Since IP networks permit a datagram to be fragmented into multiple pieces, it would be necessary for a sniffer, or firewall, to first identify the first fragments section before it can eliminate or report the existence of the overall datagram. By transmitting only a second fragment from the overall sequence of fragments, the TCP/IP stack will be required to collect and retain the second piece, assuming that the first section will be arriving out of order.

Since the elements necessary for sniffer identification and firewall isolation would be contained within the first fragment, these processes will not be able to operate if no first fragment is ever transmitted. As the covert data is wholly contained within the second fragment, and potentially encrypted, any observation of the transmission will appear as a corrupted partial communication, and thus be discarded; however, since the TCP/IP stack can be designed to be aware of this type of transmission, communication can be covert over the IP network.

BRIEF DESCRIPTION OF THE SEVERAL VIEWS OF THE DRAWINGS

Novel features and advantages of the present invention, in addition to those mentioned above, will become apparent to those skilled in the art from a reading of the following detailed description in conjunction with the accompanying drawings wherein identical reference characters refer to identical parts and in which:

FIG. 3 is a visual representation of a second fragment containing encrypted data of the datagram of FIG. 1;

FIG. 4 is a visual representation of a third fragment of the datagram of FIG. 1;

FIG. 5 is a simplified block diagram illustrating an exemplary method in accordance with the present invention; and FIG. 6 is a simplified block diagram illustrating another exemplary method in accordance with the present invention.

DETAILED DESCRIPTION OF THE INVENTION

Figure 1:
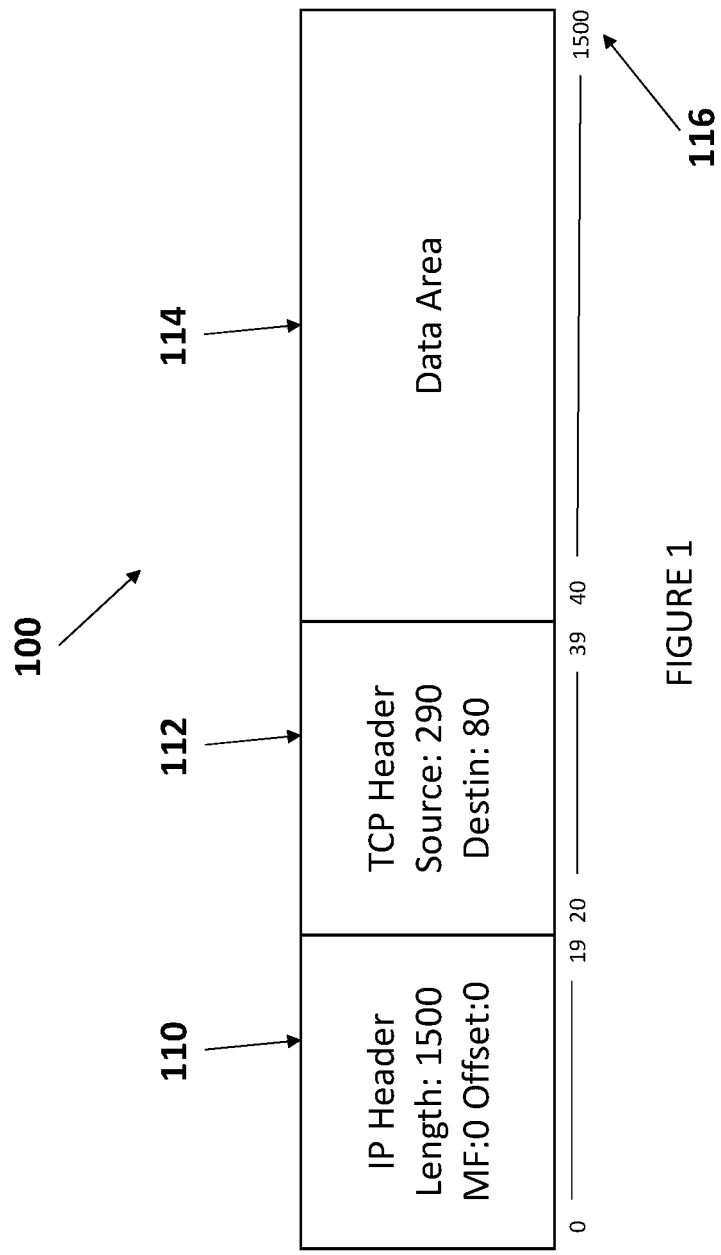
FIG. 1 is a visual representation of an exemplary hypothetical datagram for transmission on an IP network.

FIG. 1 illustrates an exemplary datagram 100. The datagram 100 may be configured for use on a network, such as without limitation, an IP based network. The datagram 100 provides an exemplary layout of a properly formatted IP datagram 100, that must be complete in order for sniffers, observers, or firewalls to properly detect and analyze the datagram 100. The illustrated exemplary datagram 100 is 1500 bytes in length (as indicated at item 116), because this is the expected length of an ethernet frame, however, any size datagram 100 is contemplated. The datagram 100 may comprise an IP header 110, a TCP header 112, and data 114. The length of the datagram 100 and various components thereof are merely exemplary and are not intended to be limiting. Any size datagram 100, and components thereof, is contemplated.

Under current protocols TCP/IP stacks are required to process datagrams that have a minimum length of 576 bytes. If the illustrated datagram 100 was transmitted normally, even if it was encrypted, its existence would be recorded by sniffers, and the protocol and port would be examined by firewalls. However, it is contemplated that current protocols could be modified and the methods illustrated and described herein can be likewise modified accordingly.

The datagram 100 may be broken down into smaller fragments. In this hypothetical example, the datagram 100 is fragmented such that no fragment is larger than a predetermined size. In exemplary embodiments the predetermined size is 576 bytes, however any size is contemplated. The predetermined size may be selected such that no fragment is larger than the size required to be recorded. This will produce a series of smaller datagram fragments. Fragmentation may be performed along an eight byte boundary, though any size boundary is contemplated. In the illustrated example, the 1500 byte datagram 100 may be broken into three smaller datagram fragments 200, 300, and 400.

Figure 2:
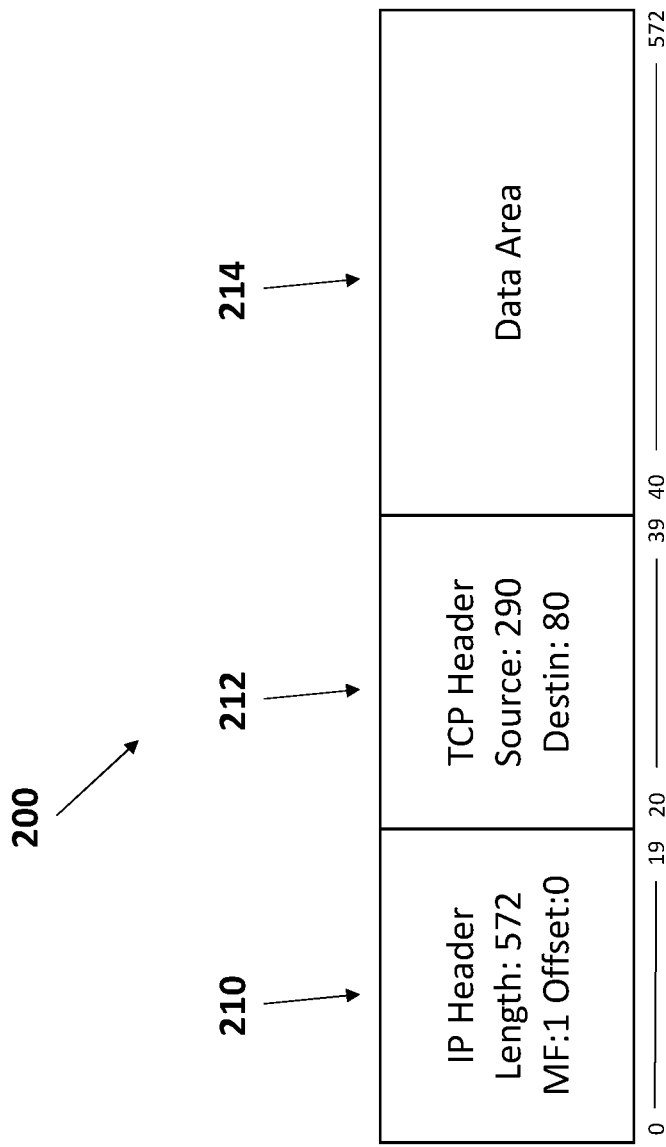
FIG. 2 is a visual representation of a first fragment of the datagram of FIG. 1.

FIG. 2 illustrates the layout and structure of the first fragment 200 of the hypothetical datagram 100. The first fragment 200 may comprise, for example without limitation, an IP header 210, for transportation, a TCP header 212 for port connection, and a first portion of data 214 for the TCP application. In this example, the first portion of data 214 comprises 532 bytes of data, though any amount of data is contemplated. In the illustrated example, this first fragment 200 will not be sent. Since this fragment 200 will never be transmitted, the electronic Internet path will never have an opportunity to determine which TCP port the data is destined for, and therefore, gateways will not be able to properly filter. Likewise, sniffers will be unable to categorize, display, and report the information as this required first fragment 200 will never arrive.

FIG. 3 illustrates the layout and structure of the second fragment 300 of the hypothetical datagram 100. The second fragment 300 may comprise an IP header 310. This second fragment 300 may also comprise a second portion of data 314. This second portion of data 314 may comprise the covert data. In the illustrated example, this second fragment 300 is the only fragment 100, 200, 300 sent. Since this is the only fragment 100, 200, 300 that will be transmitted, the second fragment 300 will be collected by the destination TCP/IP stack, and stored while waiting for the rest of the datagram fragments 200 and 400 to arrive. If this were normal operations, the three fragments 200, 300, and 400 (FIGS. 2-4) would be reassembled, so that the complete datagram 100 and corresponding data payload could be passed to the waiting TCP port; however, since the second fragment 300 is the only one to actually be transmitted, the lone second fragment 300 would eventually be discarded as data assumed to be transmitted in error. As the TCP/IP stack is responsible for collecting and reassembling the hypothetical datagram 100, the second portion of data 314 in the second datagram fragment 300 may be decrypted and passed to a specialized application without observation. If this second fragment 300 is noticed, it will appear as unusable corrupted network data. In the illustrated embodiment, the second fragment 300 may comprise 552 bytes of data, though any amount of data is contemplated.

FIG. 4 illustrates the third fragment 400 of the hypothetical datagram 100. In this example, and like the first fragment 200, this third fragment 400 is never transmitted. The third fragment 400 may comprise an IP header 410 and a third data portion 414 of any size.

FIG. 5 is a simplified block diagram illustrating an exemplary method in accordance with the present invention. A datagram of any size may be received or otherwise identified for transmission. A portion of the received datagram may be identified for covert delivery. The received datagram may then be fragmented. In exemplary embodiments, the received datagram is fragmented such that no fragment exceeds a predetermined maximum size. The predetermined maximum size may be selected to be less than what is normally processed by TCP/IP stacks. The fragmentation may be done along any size boundary. The fragment containing the identified data may then be transmitted. In exemplary embodiments, only this fragment is transmitted. The transmitted fragment may be received by a remote device and passed to a specialized application for opening. In exemplary embodiments the transmitted fragment may be encrypted and the additional step of decrypting the fragment upon receipt may be performed.

FIG. 6 is a simplified block diagram illustrating another exemplary method in accordance with the present invention. The datagram may be entirely comprised of data not designated for covert delivery. Instead, the datagram may be comprised of arbitrary or normal data. The data desired for covert delivery may instead be inserted into one of the fragments for delivery.

Of course, the provided example is merely exemplary. It is contemplated that any size datagram may be fragmented into any number and size fragments without departing from the spirit or scope of the invention. It is also contemplated that as new protocols are used, or existing protocols are modified, the illustrated and described methods may be updated accordingly.

The system and method described herein may comprise one or more electronic storage devices which comprise executable software instructions and one or more processors for executing said executable software instructions. The execution of said executable software instructions may configure the processor to perform one or more functions described herein.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A method for covertly transmitting a packet of data over a network, said method comprising the steps of:
fragmenting a datagram for transmission into at least a first fragmented section and a second fragmented section;
storing encrypted data intended for covert delivery entirely within said second fragmented section of the datagram;
within a timeout period, instructing transmission of only the second fragmented section that contains the encrypted data from a sending device, wherein no instruction to transmit any other fragmented section of the fragmented datagram, other than said second fragmented section, from the sending device is provided so that the second fragmented section as transmitted appears to be an erroneous transmission following receipt at a receiving device.

2. The method of claim 1 further comprising the step of:
decrypting the encrypted data contained within the second fragmented section at the receiving device.

3. The method of claim 2 further comprising the step of:
reading the decrypted data from within an IP layer that processes fragmented data at the receiving device.

4. The method of claim 3 wherein:
the step of reading the decrypted data is performed by a specialized application.

5. The method of claim 1 wherein:
the step of fragmenting the datagram is performed by fragmenting the datagram into fragmented sections smaller than a predetermined maximum fragment size.

6. The method of claim 5 wherein:
the predetermined maximum fragment size is selected such that each fragmented section is smaller than the size TCP/IP stacks are required to process.

7. The method of claim 1 wherein:
the datagram comprises an IP header, a TCP header, and a data packet.

8. The method of claim 7 wherein:
only a portion of the second fragmented section of the datagram is identified for covert delivery.

9. The method of claim 1 wherein:
the network comprises an IP network.

10. A method for covertly transmitting a packet of data over an IP network, the method comprising the steps of:
receiving a datagram for transmission comprising an IP header, a TCP header, and data packet, wherein said data packet comprises a first portion of data desired for covert delivery and a second portion comprising other data;
fragmenting the datagram into at least two fragments, each comprising an IP header, smaller than a predetermined maximum fragment size, wherein a first one of said fragments comprises at least a portion of said other data and a subsequent one of said fragments comprises the portion of data desired for covert delivery;
identifying the subsequent fragment as comprising the data desired for covert delivery; and
transmitting only the identified subsequent fragment from a local device such that no other fragments of the datagram, including at least the first one of said fragments, are transmitted from the local device before expiration of a time period, such that receipt of only the identified subsequent fragment at a remote device appears to be a result of an erroneous transmission at said remote device;
wherein the predetermined maximum fragment size is selected such that each of said at least two fragments are smaller than a size TCP/IP stacks of said IP network are permitted to process.

11. The method of claim 10 further comprising the step of:
encrypting the identified subsequent fragment prior to transmission.

12. The method of claim 11 further comprising the steps of:
receiving only the encrypted subsequent fragment at a remote device;
decrypting the encrypted subsequent fragment at the remote device; and
opening the decrypted subsequent fragment at the remote device.

13. The method of claim 10 wherein:
the IP network comprises the world wide web.

14. The method of claim 10 wherein:
the fragmenting is performed along an eight-byte boundary.

15. The method of claim 10 wherein:
the predetermined fragment size is 576 bytes.

16. A method for covertly transmitting a packet of data over an IP packet-switched network, the method comprising the steps of:
receiving a datagram for transmission at a transmitting device;
fragmenting the datagram into at least two fragments such that each fragment is smaller than a maximum predetermined size defined by said IP packet-switched network;
inserting encrypted data for covert delivery into one of the at least two fragments which is not a first fragment, while not inserting encrypted data for covert delivery into at least the first fragment; and
transmitting the fragment comprising the encrypted data from the transmitting device for covert delivery, and not transmitting the first fragment from the transmitting device so that receipt of the fragment comprising the encrypted data appears as a corrupted partial transmission at a receiving device upon expiration of a time period after receipt of the fragment comprising the encrypted data at the receiving device.

* * * * *